(12) United States Patent
     Sastry (10) Patent No.: US 11,386,333 B1
(45) Date of Patent: Jul. 12, 2022

(54) BLOCK CHAIN METHOD AND SYSTEM FOR SECURING USER DATA FROM AN ON-LINE COURSE

(71) Applicant: Amesite Inc., Ann Arbor, MI (US)

(72) Inventor: Ann Marie Sastry, Ann Arbor, MI (US)

(73) Assignee: Amesite Inc., Ann Arbor, MI (US)

( * ) Notice: Subject to any disclaimer, the term of this patent is extended or adjusted under 35 U.S.C. 154(b) by 636 days.

(21) Appl. No.: 16/254,316

(22) Filed: Jan. 22, 2019

Related U.S. Application Data (60) Provisional application No. 62/620,376, filed on Jan. 22, 2018.

(51) Int. Cl.
  *G06N 5/02*  (2006.01)
  *H04L 67/1097*  (2022.01)
  *G09B 5/00*  (2006.01)

(52) U.S. Cl.
  CPC ............ *G06N 5/02* (2013.01); *G09B 5/00* (2013.01); *H04L 67/1097* (2013.01)

(58) Field of Classification Search
  CPC ......... G06N 5/02; G09B 5/00; H04L 67/1097
  USPC .......................................................... 705/326
  See application file for complete search history.

(56) References Cited

U.S. PATENT DOCUMENTS

2008/0131861 A1* 6/2008 Redd .................... G09B 7/00
                                                      434/362
2018/0117447 A1* 5/2018 Tran ..................... G16H 10/60

* cited by examiner

*Primary Examiner* — Sibte H Bukhari
(74) *Attorney, Agent, or Firm* — Richard T Ogawa; Ogawa P.C.

(57) ABSTRACT

In an example, the present invention provides a meta data processing apparatus for processing sensor inputs and providing feedback to a user for an on-line course. The invention provides for storing the information on a public block chain using a plurality of servers.

20 Claims, 7 Drawing Sheets

BLOCK CHAIN METHOD AND SYSTEM FOR SECURING USER DATA FROM AN ON-LINE COURSE

CROSS REFERENCE TO RELATED PATENT APPLICATION

This application claims priority to U.S. Provisional Patent Application No. 62/620,376, filed on Jan. 22, 2018, which is hereby incorporation by reference in its entirety.

BACKGROUND OF INVENTION

The present invention relates generally to processing techniques for course materials. In particular, the invention provides a method and system for using a block chain configured on a public ledge for securing user information associated with an on-line course, a certification or degree, or other information in the field of education. More particularly, the invention provides a method and system using data capturing devices configured with artificial intelligence techniques, and then securing storing a certification associated with a learning process associated with such method and system. Merely by way of example, the invention has been applied to a mobile computing device configured to a world wide network of computers, however, the invention has many other applications.

"Education is the process of facilitating learning, or the acquisition of knowledge, skills, values, beliefs, and habits. Educational methods include storytelling, discussion, teaching, training, and directed research. Education frequently takes place under the guidance of educators, but learners may also educate themselves. Education can take place in formal or informal settings and any experience that has a formative effect on the way one thinks, feels, or acts may be considered educational. The methodology of teaching is called pedagogy." https://en.wikipedia.org/wiki/Education.

Education originally occurred through a one by one basis between teacher and student or master and apprentice or partner and associate. Classrooms eventually took over to teach children in masses from pre-school to higher education. Most recently, education has been implemented on-line via the Internet to facilitate learning for students. Although education has progressed, it is desired that techniques to overcome difficulties in education, and more particularly learning are desired.

SUMMARY

According to the present invention, techniques related to course materials. In particular, the invention provides a method for using a block chain configured on a public ledge for securing user information associated with an on-line course, a certification or degree, or other information in the field of education. More particularly, the invention provides a method and system using data capturing devices configured with artificial intelligence techniques, and then securing storing a certification associated with a learning process associated with such method and system. Merely by way of example, the invention has been applied to a mobile computing device configured to a world wide network of computers, however, the invention has many other applications.

In an example, the present invention provides a meta data processing apparatus for processing sensor inputs and providing feedback to a user for an on-line course. The apparatus has a housing configured with a display device. In an example, the display device is coupled to an input device for communicating text information from a user. The device has a processing device, such as a central processing unit, graphics processing unit, digital signal processing unit, micro controller or others.

In an example, the apparatus has a network interface coupled to the processing device. In an example, the network interface is configured to couple to a world wide network of computers or a local network of computers. The apparatus has a memory resource coupled to the processing device and an application comprising a course module. In an example, the course module comprises a plurality of templates and at least one video file, and processes, each of which may be desirably tailored to a user based upon feedback from various processing modules.

In an example, the apparatus has an image capturing device coupled to the housing and configured to the processing device. In an example, the image capturing device is configured to capture an image of at least a facial expression in a first format of the user while interacting with the course module. The image capturing device can be a high-resolution camera that is suitable for capturing the image and has sufficient pixels to be processed.

In an example, the apparatus has a plurality of sensors for identifying a spatial orientation of the user while interacting with the course module. In an example, the sensor devices or plurality of external data capturing devices comprises a camera, a keyboard, an accelerometer sensor, an rf sensor, a gyroscope, a chemical sensor, a temperature sensor, a microphone, or other input device. Of course, there can be other variations, modifications, and alternatives.

In various embodiments, the apparatus may include a mixed reality or virtual reality headset that captures the user data using sensors from within a headset (e.g. Microsoft HoloLens and Mixed Reality platform, Magic Leap platform, Google Daydream, etc.) or that captures user data from a headset using external sensors, (e.g. HTC Vive, Oculus Rift) Various embodiments of headsets may provide spatial orientation data including where the user is viewing within an image (e.g. a lecturer, white board, etc.), where they are gazing within an image (e.g. equation, graph or diagram, etc.), duration of time viewing materials (e.g. reading a slide, or .pdf, etc.); voice data (e.g. a user repeating a foreign language phrase); and the like.

In an example, the apparatus has a natural language processor configured for processing information from the text information while the user is interacting with the course module. In an example, the natural language processor is configured to process the text information to identify a characteristic of the user in association with the course. Additionally, the apparatus has an artificial intelligence module coupled to the processing device. In an example, the artificial intelligence module comprises a neural network module comprising a plurality of nodes. In an example, the plurality of nodes can be numbered from 1-N, where N is an integer greater than 10 and less than 10,000,000, and possibly greater, depending upon the example. The plurality of nodes are coupled to respective sensors, image capturing device, natural language processor, or other information receiving devices, and an output. Of course, there can be other variations, modifications, and alternatives.

In an example, the apparatus has an output handler coupled to the output of the neural network module, the output handler configured to provide feedback to the user. The feedback comprises a plurality of characteristics to allow the user to achieve a predetermined score within a range for the course.

The above examples and implementations are not necessarily inclusive or exclusive of each other and may be combined in any manner that is non-conflicting and otherwise possible, whether they be presented in association with a same, or a different, embodiment or example or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary. Thus, the above examples implementations are illustrative, rather than limiting.

DETAILED DESCRIPTION OF THE EXAMPLES

According to the present invention, techniques related to course materials are provided. In particular, the invention provides a method and system for using a block chain configured on a public ledge for securing user information associated with an on-line course, a certification or degree, or other information in the field of education. More particularly, the invention provides a method and system using data capturing devices configured with artificial intelligence techniques, and then securing storing a certification associated with a learning process associated with such method and system. Merely by way of example, the invention has been applied to a mobile computing device configured to a world wide network of computers, however, the invention has many other applications.

In an example, one or more of the definitions may be used in the following description of the specification.

EIs or Education Institutions means a non-profit, for-profit organizations, or entitie(s) that offer education or training.

IACs or Institutional Accreditation Credentials means verified receipt of passed reviews or diligence by qualified bodies, as defined by the relevant society, committee, regulatory agency, non profit body or entity, to the field of learning, standards, or other regulatory body.

EPs or Educational Products means courses or other educational offerings.

LIs means Learner Identification.

EICs or EI coins or tradeable currencies or points for learning products means a point or monetary entity associated with learning products.

In an example, the present invention provides a trustworthy authentication technique. In an example, the technique is for universities and colleges (that contain the key expertise and scholarship) to qualify, codify and ratify information that is "canonical" and therefore meritorious of inclusion in higher education. In an example, all institutions, courses, or instructors will go through accreditation, which of course is run by the members of the system, not an outside entity.

In an example, the technique provides for creating a block chain of universities or colleges or entities that have been authenticated and accredited. In an example, other aspects that can be configured into a block chain include, but are not limited to, course materials, transcripts, matriculation data, and other information. Rather than being in a central repository, any and all such information will be distributed on a public ledger across a world wide network of computers in an encrypted manner. A key will allow an authorized entity to access such information using conditions if needed, such as time, place, and duration. Of course, there can be other variations, modifications, and alternatives.

Figure 1:
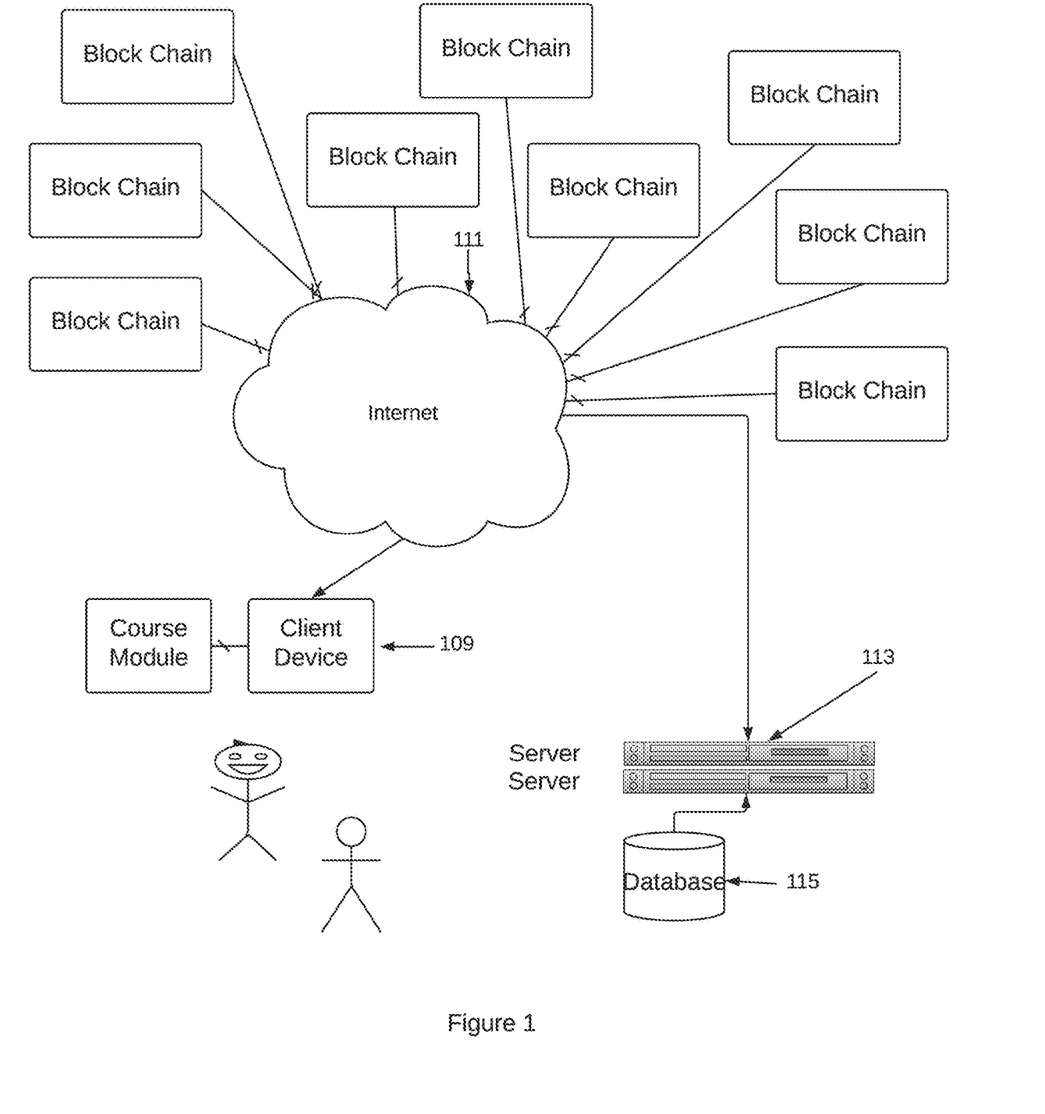
FIG. 1 is a simplified diagram with a network system according to an example of the present invention.
Figure 1A:
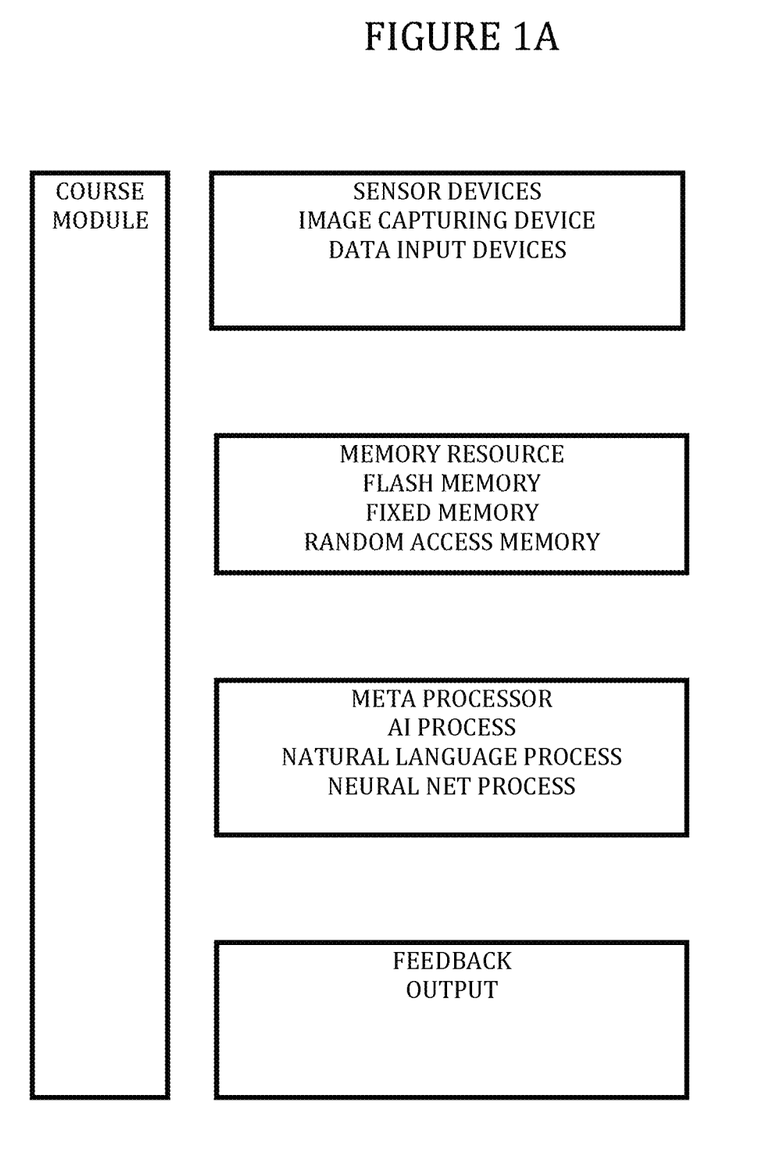
FIG. 1A is a simplified diagram of a meta processing system for learning according to an example of the present invention.

FIG. 1A is a simplified diagram of a meta processing system for learning according to an example of the present invention. As shown, the system has a course module, which includes templates, video, and other information. The course can be directed to a variety of subjects including but not limited to science, math, English, history, psychology, engineering, business, finance, accounting, or any other college course subject.

As shown, the course module is configured with a plurality of sensor devices, an image capturing device, data input device, virtual reality (VR) (including augmented reality, mixed reality), or the like. In an example, the sensor devices or plurality of external data capturing devices comprises a camera, a keyboard, an accelerometer sensor, an rf sensor, a gyroscope, a chemical sensor, a temperature sensor, a microphone, VR device, or other input device. Of course, there can be other variations, modifications, and alternatives.

In an example, the system has a meta processor. The meta processor includes an artificial intelligence process, a natural language process, and neural net process each of which can be run configured with each other or independently from each other.

In an example, the invention provides a method of using the meta module process of capturing data and processing the data for feedback to a user, e.g., learner, student, or other human entity. In an example, the method includes providing information related to a course in a first format. In an example, the course can be sourced from an off-line classroom course.

In an example, the method includes transferring the information in the first format to a server device. The server device can ben coupled to a plurality of computers on a world wide network of computers, such as the Internet. In an example, the method includes storing the information in the first format into a memory resource coupled to the server device.

In an example, the method includes processing the information related to the course on the server device to convert the course into a second format, the second format comprising a plurality of templates and a video. The second format is suitable for using the course in an on-line manner.

The method configures the course in the second format with a meta module. As noted, the meta module comprises an artificial intelligence module. In an example, the artificial intelligence module comprises a plurality of input interfaces each of the input interfaces coupled to a node. In an example, each of the nodes comprises a weighing function. In an example, each of the nodes is coupled to an output interface.

In an example, the artificial intelligence module comprises a neural network process configured on a neural network process, wherein the plurality of nodes comprises at least 1 million nodes. In an example, the artificial intelligence module comprises a neural network process configured on a processing device.

In an example, the method includes configuring the course coupled to the artificial intelligence module to a plurality of external data capturing devices. Each of the plurality of external data captures devices being spatially disposed on a mobile computing device. In an example, the mobile computing device is coupled to the world wide network of computers.

In an example, the method includes initiating use of the course in the second format coupled to the artificial intelligence module from the mobile computing device and capturing data from a user of the mobile computing device from each of the plurality of external data capturing devices, while the user is actively interacting with the course in the second format from the mobile computing device.

In an example, the method includes transferring data from each of the plurality of external data capturing devices from the mobile computing device to the artificial intelligence module and, thereafter, outputting a feedback from the artificial intelligence module to the user of the course.

In an example, the method also includes finalizing use of the course in the second format; and initiating a test associated with the course. Optionally, the method includes finalizing use of the course in the second format; initiating a test associated with the course; passing the test; and transferring a credit for the course to the user of the mobile device and the course. Of course, there can be other variations, modifications, and alternatives.

Optionally, the method can also includes transferring spatial movement information from a wearable device to the mobile computing device. The wearable device can be a watch, a suit, a vest, a headset, a pair of glasses, a pair of pants, shoes, or other wearable device. The wearable device can include a plurality of sensing devices spatially disposed on the device. A wireless or wired transceiver or transmitter can transmit information from each of the sensors to the meta processor.

In an example, the method includes finalizing use of the course in the second format. The method includes initiating a test associated with the course and passing the test (or taking it over if the user does not pass the course). The method includes transferring a credit for the course to the user of the mobile device and the course, configuring the credit with a time and date stamp and other information into a block of information, and adding the block of information into a chain of other blocks of information to form a block chain associated with the user in an encrypted format distributed on a public ledger configuration provided on a world wide network of computers.

In an example, the course module and other elements can be implemented using a mobile device. In an example, the mobile device is a lap top computer, a tablet, an iPad, a Smart phone, or other mobile device. Of course, there can be other variations, modifications, and alternatives.

In an alternative example, the present invention provides a meta data processing apparatus for processing sensor inputs and providing feedback to a user for an on-line course. The apparatus has a housing configured with a display device. In an example, the display device is coupled to an input device for communicating text information from a user. The device has a processing device, such as a central processing unit, graphics processing unit, digital signal processing unit, micro controller or others.

In an example, the apparatus has a network interface coupled to the processing device. In an example, the network interface is configured to couple to a world wide network of computers or a local network of computers. The apparatus has a memory resource coupled to the processing device and an application comprising a course module. In an example, the course module comprises a plurality of templates and at least one video file, and processes, each of which may be desirably tailored to a user based upon feedback from various processing modules.

In an example, the apparatus has an image capturing device coupled to the housing and configured to the processing device. In an example, the image capturing device is configured to capture an image of at least a facial expression in a first format of the user while interacting with the course module. The image capturing device can be a high-resolution camera that is suitable for capturing the image and has sufficient pixels to be processed.

In an example, the apparatus has a plurality of sensors for identifying a spatial orientation of the user while interacting with the course module. In an example, the sensor devices or plurality of external data capturing devices comprises a camera, a keyboard, an accelerometer sensor, an rf sensor, a gyroscope, a chemical sensor, a temperature sensor, a microphone, or other input device. Of course, there can be other variations, modifications, and alternatives.

In an example, the apparatus has a natural language processor configured for processing information from the text information while the user is interacting with the course module. In an example, the natural language processor is configured to process the text information to identify a characteristic of the user in association with the course. Additionally, the apparatus has an artificial intelligence module coupled to the processing device. In an example, the artificial intelligence module comprises a neural network module comprising a plurality of nodes. In an example, the plurality of nodes can be numbered from 1-N, where N is an integer greater than 10 and less than 10,000,000, and possibly greater, depending upon the example. The plurality of nodes are coupled to respective sensors, image capturing device, natural language processor, or other information receiving devices, and an output. Of course, there can be other variations, modifications, and alternatives.

In an example, the apparatus has an output handler coupled to the output of the neural network module, the output handler configured to provide feedback to the user. The feedback comprises a plurality of characteristics to allow the user to achieve a predetermined score within a range for the course.

In an example, the course is related to science, math, English, history, psychology, engineering, business, finance, accounting, or any other college course subject.

In an example, the apparatus includes a wearable device comprising a set of sensors to characterize movement, orientation, temperature, heart rate, breathing rate, oxygen, and other parameters of the user while interacting with the course, the wearable device being coupled to an input of the artificial intelligence module.

In an example, the housing is shock proof.

In an example, the neural network module is configured to receive information from the image capturing device and output a learning characteristic of the user.

In an example, the neural network module is configured to receive information associated with a facial expression and an eye response from the image capturing device and output a learning characteristic of the user.

In an example, the method includes transferring a spatial location information and a time information to the artificial intelligence module.

In a preferred example, an output handler coupled to the output of the neural network module, the output handler configured to provide feedback to the user and configure the Myamesite™ course. The myamesite course has been configured with feedback to create a specialized or personalized course for the user or student. Further details of the present method, apparatus, and system can be found throughout the present specification and more particularly below.

FIG. 1 is a simplified diagram with a network system according to an example of the present invention. As shown, the network system has a course module, which is coupled to a client device 109, which is coupled to a world wide network of computers, such as the Internet 111. In an example, the Internet comprises a plurality of server devices 113 coupled to memory resource 115 or database. The system also includes a plurality of servers configured with a plurality of block chain information, as shown.

In an example, the block chain information can be provided by a blockchain formation, which can be described in Wikipedia.com. In an example, a main chain consists of the longest series of blocks from the genesis block to the current block. Orphan blocks exist outside of the main chain. In an example, a blockchain is a growing list of records, called blocks, which are linked using cryptography. Each block contains a cryptographic hash of the previous block, a timestamp, and transaction data (generally represented as a merkle tree root hash or other type of hash or configuration). By design, a blockchain is resistant to modification of the data. The blockchain is an open, distributed ledger that can record transactions between two parties efficiently and in a verifiable and permanent way. For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. Although blockchain records are not unalterable, blockchains may be considered secure by design and exemplify a distributed computing system with high *Byzantine* fault tolerance. Decentralized consensus has therefore been claimed with a blockchain. Of course, there can be other variations, modifications, and alternatives.

Figure 2:
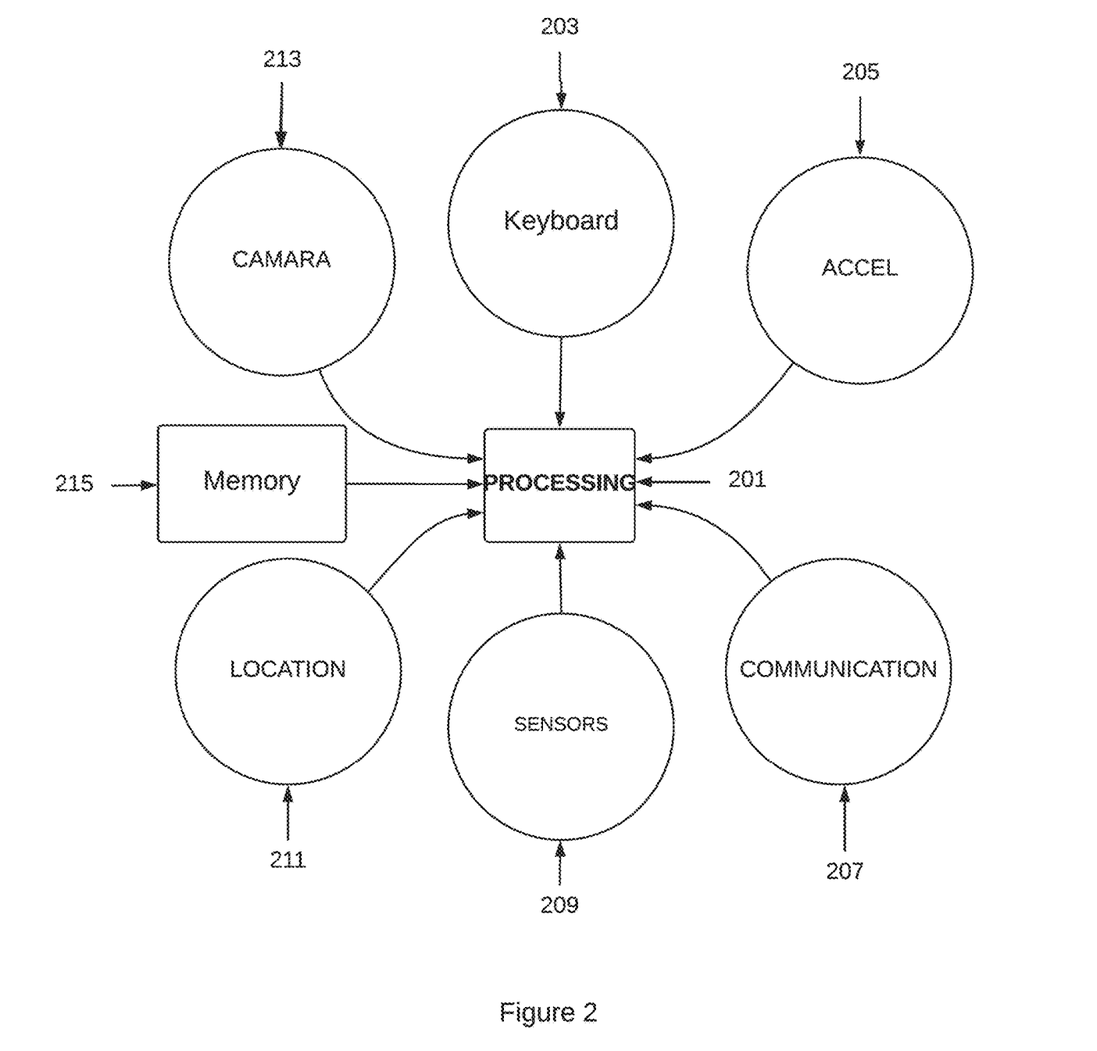
FIG. 2 is a more detailed diagram of a processing engine with input devices according to an example of the present invention.

FIG. 2 is a more detailed diagram of a processing engine with input devices according to an example of the present invention. In an example, the processing engine 201 is coupled to input devices 203, 205, 207, 209, 211, 214, among others. The processing engine interfaces with a memory resource, such as storage 215.

In an example, the processing engine is configured with a meta data processing apparatus for processing sensor inputs and providing feedback to a user for an on-line course. The apparatus has a housing configured with a display device. In an example, the display device is coupled to an input device for communicating text information from a user. The device has a processing device, such as a central processing unit, graphics processing unit, digital signal processing unit, micro controller or others.

In an example, the apparatus has a network interface 207 coupled to the processing device. In an example, the network interface is configured to couple to a world wide network of computers or a local network of computers. The apparatus has a memory resource 215 coupled to the processing device and an application comprising a course module. In an example, the course module comprises a plurality of templates and at least one video file, and processes, each of which may be desirably tailored to a user based upon feedback from various processing modules.

In an example, the apparatus has an image capturing device coupled to the housing and configured to the processing device. In an example, the image capturing device is configured to capture an image of at least a facial expression in a first format of the user while interacting with the course module. The image capturing device can be a high resolution camera that is suitable for capturing the image and has sufficient pixels to be processed.

In an example, the apparatus has a plurality of sensors for identifying a spatial orientation of the user while interacting with the course module. In an example, the sensor devices or plurality of external data capturing devices comprises a camera, a keyboard, an accelerometer sensor, an rf sensor, a gyroscope, a chemical sensor, a temperature sensor, a microphone, or other input device. Of course, there can be other variations, modifications, and alternatives.

In an example, the apparatus has a natural language processor configured for processing information from the text information while the user is interacting with the course module. In an example, the natural language processor is configured to process the text information to identify a characteristic of the user in association with the course. Additionally, the apparatus has an artificial intelligence module coupled to the processing device. In an example, the artificial intelligence module comprises a neural network module comprising a plurality of nodes. In an example, the plurality of nodes can be numbered from 1-N, where N is an integer greater than 10 and less than 10,000,000, and possibly greater, depending upon the example. The plurality of nodes are coupled to respective sensors, image capturing device, natural language processor, or other information receiving devices, and an output. Of course, there can be other variations, modifications, and alternatives.

In an example, the apparatus has an output handler coupled to the output of the neural network module, the output handler configured to provide feedback to the user. The feedback comprises a plurality of characteristics to allow the user to achieve a predetermined score within a range for the course.

In an example, the course is related to science, math, English, history, psychology, engineering, business, finance, accounting, or any other college course subject.

In an example, the apparatus includes a wearable device comprising a set of sensors to characterize movement, orientation, temperature, heart rate, breathing rate, oxygen, and other parameters of the user while interacting with the course, the wearable device being coupled to an input of the artificial intelligence module.

In an example, the housing is shock proof.

In an example, the neural network module is configured to receive information from the image capturing device and output a learning characteristic of the user.

In an example, the neural network module is configured to receive information associated with a facial expression and an eye response from the image capturing device and output a learning characteristic of the user.

In an example, the method includes transferring a spatial location information and a time information to the artificial intelligence module.

In a preferred example, the an output handler coupled to the output of the neural network module, the output handler configured to provide feedback to the user and configure the Myamesite™ course. The myamesite course has been configured with feedback to create a specialized or personalized course for the user or student.

Figure 3:
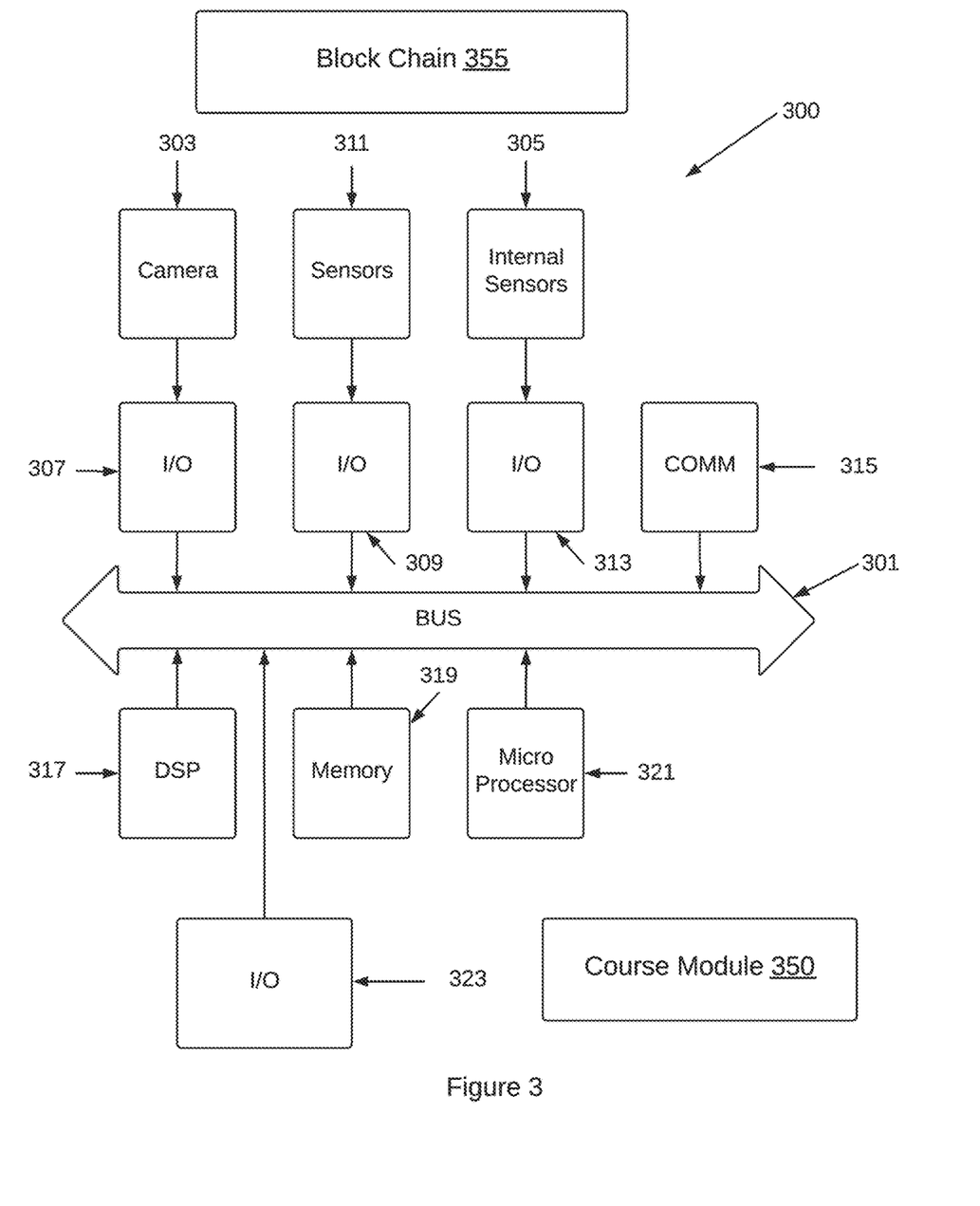
FIG. 3 is a more detailed diagram of a processing system according to an example of the present invention.

FIG. 3 is a more detailed diagram of a processing system 300 according to an example of the present invention. As shown, the system has a bus 301 that communicates with input output devices 307, 309, 313. The input output devices is coupled to camera 303, sensors 311, and internal sensors 305. The bus also has communication module 315, a digital signal processor 317, other input output devices 323, memory resource 319, and microprocessor 321. The bus also communications with course module 350, which has been previously explained throughout this specification.

In an example, the system also has a block chain process and related block chain information 355 that is distributed through a network. In an example, the system can take learning data, and perform a block chain process, including encryption and distribution for public or selective viewing.

In an example, the system can be configured using a secure learning experience using an encrypted encoded network. In an example, the method includes configuring information using a course module derived from an interactive course platform coupled to a server and a network. In an example, the course module comprises information provided from a human user coupled to a plurality of sensing devices, including at least an image capturing device, a motion sensor, and an ambient sensor. For security, the method assigns a time and date stamp on the course module, and then processes information using the course module to validate it against a predetermined quality metric, coding format, and ratification information to configure a second course module in a canonical format. In an example, the method processes information using the course module in the second format using an encryption process. The method then configures information using the course module on a public ledge in a block chain configuration.

Figure 4:
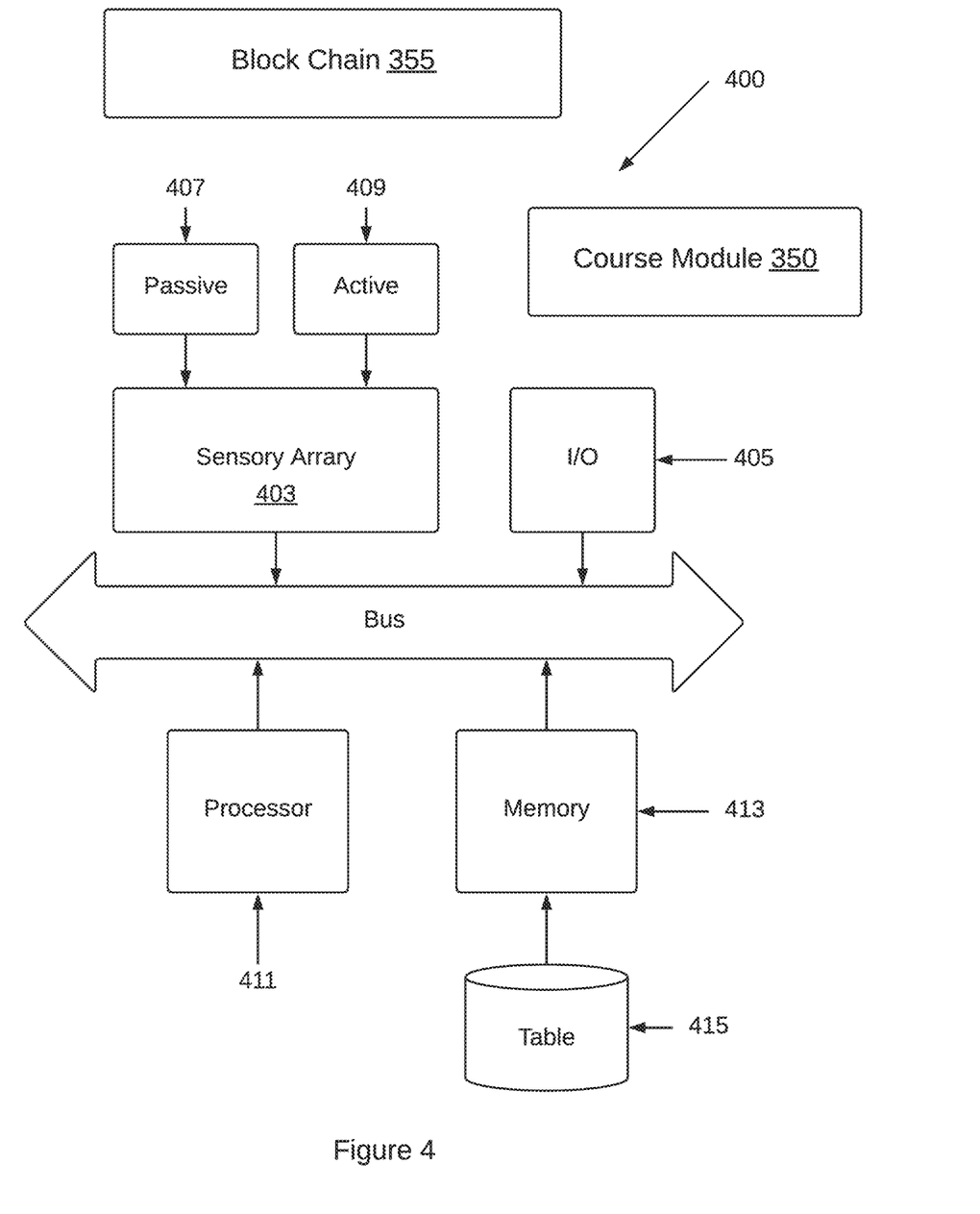
FIG. 4 is a more detailed diagram of an alternative processing system according to an example of the present invention.

FIG. 4 is a more detailed diagram of an alternative processing system 400 according to an example of the present invention. As shown, the system has a bus that communicates to a sensor array 403, which includes both passive sensors 407 and active sensors 409. The bus also has input output device 405, processor 411, memory resource 413, which is coupled to mass storage 415 including documents, templates, and other configurations. A course module 350 is coupled to the bus. In an example, the system also has a block chain process and related block chain information 355 that is distributed through a network. In an example, the system can take learning data, and perform a block chain process, including encryption and distribution for public or selective viewing.

Figure 5:
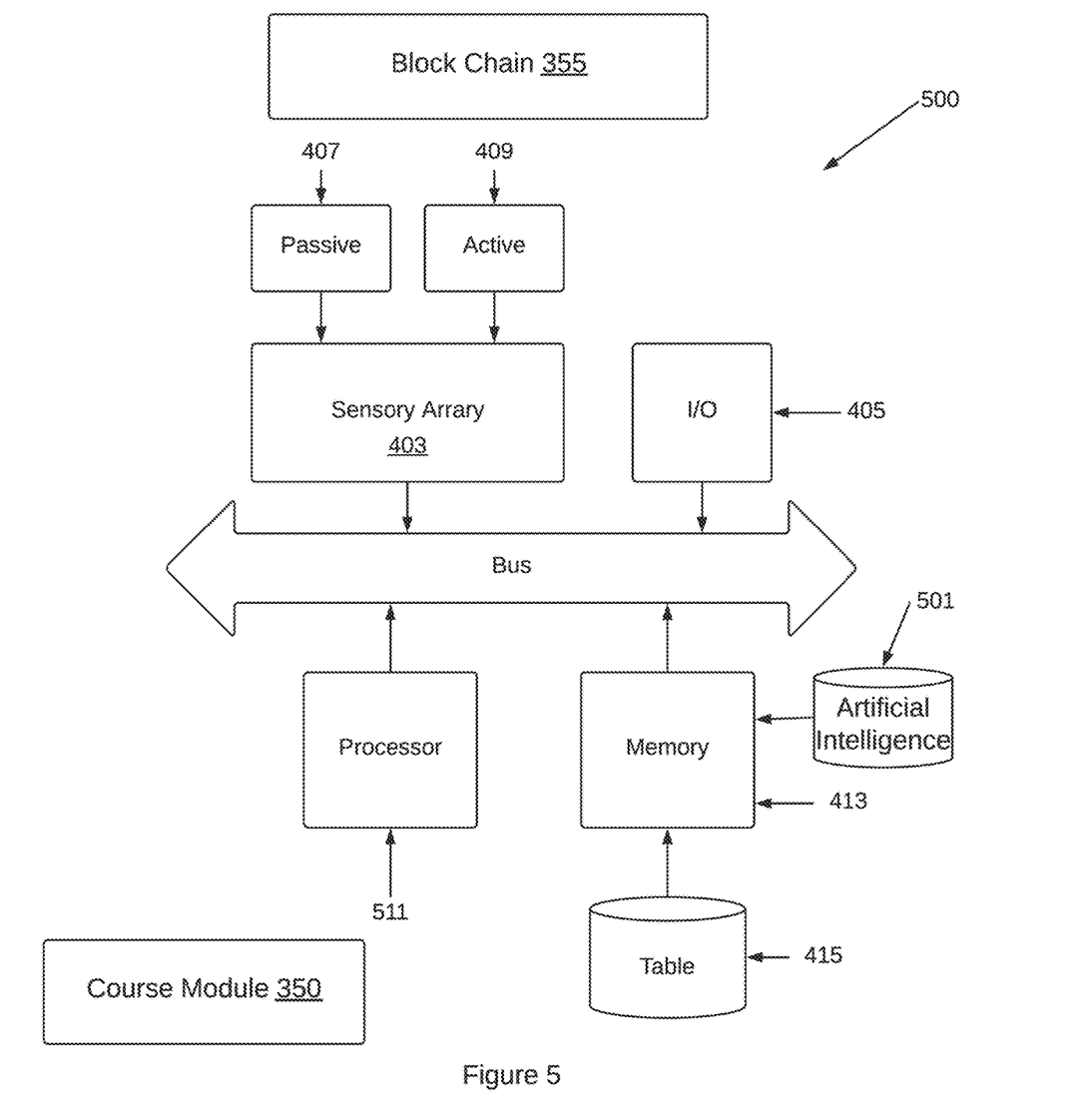
FIG. 5 is a more detailed diagram of an alternative processing system according to an example of the present invention.

FIG. 5 is a more detailed diagram of an alternative processing system 500 according to an example of the present invention. As shown, the system has a bus that communicates to a sensor array 403, which includes both passive sensors 407 and active sensors 409. The bus also has input output device 405, processor 511, which can include artificial intelligence processors, digital signal processors, and other processors, memory resource 413, which is coupled to mass storage 415 including documents, templates, and other configurations. An artificial intelligence module 501 is also coupled to the memory resource. The artificial intelligence module includes configurations that are learned and used in accordance to this example with the course module 350. A course module is coupled to the bus.

In an example, the system also has a block chain process and related block chain information 355 that is distributed through a network. In an example, the system can take learning data, and perform a block chain process, including encryption and distribution for public or selective viewing.

Figure 6:
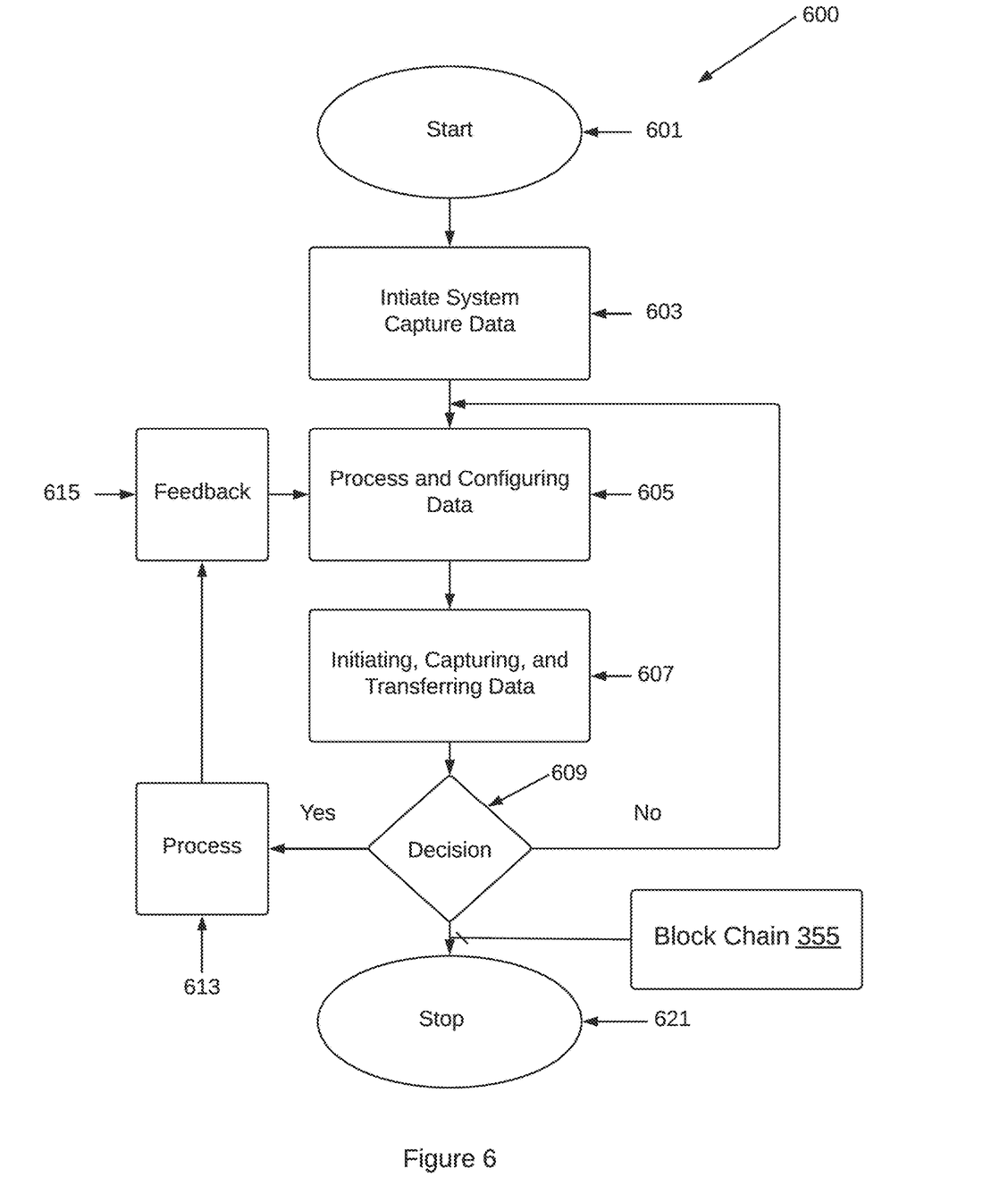
FIG. 6 is a simplified flow diagram of an integrated data processing process according to an example of the present invention.

FIG. 6 is a simplified flow diagram 600 of an integrated data processing process according to an example of the present invention. In an example, the method begins with start, step 601. In an example, the invention provides a method of using the meta module process of capturing data and processing the data for feedback to a user, e.g., learner, student, or other human entity. In an example, the present process provides for a single integrated application to perform various processes that can be implemented using a combination of hardware and software. In an example, the method includes providing information related to a course in a first format, such as a video, a text book, or any combination thereof. In an example, the course can be sourced from an off-line class-room course.

In an example, the method includes transferring the information in the first format to a server device. The server device can be coupled to a plurality of computers on a world wide network of computers, such as the Internet. In an example, the method includes storing the information in the first format into a memory resource coupled to the server device.

In an example, the method includes processing the information related to the course on the server device to convert the course into a second format, the second format comprising a plurality of templates and a video. The second format is suitable for using the course in an on-line manner through the Internet and client devices.

The method configures the course in the second format with a meta module. As noted, the meta module comprises an artificial intelligence module. In an example, the artificial intelligence module comprises a plurality of input interfaces each of the input interfaces coupled to a node. In an example, each of the nodes comprises a weighing function. In an example, each of the nodes is coupled to an output interface.

In an example, the artificial intelligence module comprises a neural network process configured on a neural network process, wherein the plurality of nodes comprises at least 1 million nodes. In an example, the artificial intelligence module comprises a neural network process configured on a processing device.

In an example, the method initiates 603 capturing data from a plurality of sensing devices, which can be internal or external, passive, or active in an example, to teach the neural network process including the plurality of nodes with selected weighing functions.

In an example, the method includes configuring 605 the course coupled to the artificial intelligence module to a plurality of external data capturing devices, each of the devices being associated with a weighing function for the neural network process. Each of the plurality of external data captures devices being spatially disposed on a mobile computing device or other device. In an example, the mobile computing device is coupled to the world wide network of computers.

In an example, the method includes initiating 607 use of the course in the second format coupled to the artificial intelligence module from the mobile computing device, among other client devices, and capturing data from a user of the mobile computing device from each of the plurality of external data capturing devices, while the user is actively interacting with the course in the second format from the mobile computing device.

In an example, while using the module associated with the course, if any rules and/or decisions related to neural network process is triggered, step 609, the method processes information 613 associated with such rules and/or decisions, and provides feedback 615 to the user in an example. As further shown, n an example, the method includes transferring data from each of the plurality of external data capturing devices from the mobile computing device to the artificial intelligence module and, thereafter, outputting a feedback 615 from the artificial intelligence module to the user of the course.

In an example, the method also includes finalizing use of the course in the second format; and initiating a test associated with the course. Optionally, the method includes finalizing use of the course in the second format; initiating a test associated with the course; passing the test; and transferring a credit for the course to the user of the mobile device and the course. The method ends at stop, step 621. Of course, there can be other variations, modifications, and alternatives.

Optionally, the method can also includes transferring spatial movement information from a wearable device to the mobile computing device. The wearable device can be a watch, a suit, a vest, a headset, a pair of glasses, a pair of pants, shoes, or other wearable device. The wearable device can include a plurality of sensing devices spatially disposed on the device. A wireless or wired transceiver or transmitter can transmit information from each of the sensors to the meta processor.

In an example, the course module and other elements can be implemented using a mobile device. In an example, the mobile device is a lap top computer, a tablet, an iPad, a Smart phone, or other mobile device. Of course, there can be other variations, modifications, and alternatives.

In an example, various hardware elements of the invention can be implemented using a smart phone with a capture image of a user according to an embodiment of the present invention. As shown, the smart phone includes a housing, display, and interface device, which may include a button, microphone, or touch screen. Preferably, the phone has a high-resolution camera device, which can be used in various modes. An example of a smart phone can be an iPhone from Apple Computer of Cupertino Calif. Alternatively, the smart phone can be a Galaxy from Samsung or others.

In an example, the smart phone includes the following features (which are found in an iPhone from Apple Computer, although there can be variations), see www.apple.com, which is incorporated by reference. In an example, the phone can include 802.11b/g/n Wi-Fi (802.11n 2.4 GHz only), Bluetooth 2.1+EDR wireless technology, Assisted GPS, Digital compass, Wi-Fi, Cellular, Retina display, 5-megapixel iSight camera, Video recording, HD (720p) up to 30 frames per second with audio, Photo and video geotagging, Three-axis gyro, Accelerometer, Proximity sensor, and Ambient light sensor. Of course, there can be other variations, modifications, and alternatives.

An exemplary electronic device may be a portable electronic device, such as a media player, a cellular phone, a personal data organizer, or the like. Indeed, in such embodiments, a portable electronic device may include a combination of the functionalities of such devices. In addition, the electronic device may allow a user to connect to and communicate through the Internet or through other networks, such as local or wide area networks. For example, the portable electronic device may allow a user to access the internet and to communicate using e-mail, text messaging, instant messaging, or using other forms of electronic communication. By way of example, the electronic device may be a model of an iPod having a display screen or an iPhone available from Apple Inc.

In certain embodiments, the device may be powered by one or more rechargeable and/or replaceable batteries. Such embodiments may be highly portable, allowing a user to carry the electronic device while traveling, working, exercising, and so forth. In this manner, and depending on the functionalities provided by the electronic device, a user may listen to music, play games or video, record video or take pictures, place and receive telephone calls, communicate with others, control other devices (e.g., via remote control and/or Bluetooth functionality), and so forth while moving freely with the device. In addition, device may be sized such that it fits relatively easily into a pocket or a hand of the user. While certain embodiments of the present invention are described with respect to a portable electronic device, it should be noted that the presently disclosed techniques may be applicable to a wide array of other, less portable, electronic devices and systems that are configured to render graphical data, such as a desktop computer.

In the presently illustrated embodiment, the exemplary device includes an enclosure or housing, a display, user input structures, and input/output connectors. The enclosure may be formed from plastic, metal, composite materials, or other suitable materials, or any combination thereof. The enclosure may protect the interior components of the electronic device from physical damage, and may also shield the interior components from electromagnetic interference (EMI).

The display may be a liquid crystal display (LCD), a light emitting diode (LED) based display, an organic light emitting diode (OLED) based display, or some other suitable display. In accordance with certain embodiments of the present invention, the display may display a user interface and various other images, such as logos, avatars, photos, album art, and the like. Additionally, in one embodiment, the display may include a touch screen through which a user may interact with the user interface. The display may also include various function and/or system indicators to provide feedback to a user, such as power status, call status, memory status, or the like. These indicators may be incorporated into the user interface displayed on the display.

In an embodiment, one or more of the user input structures are configured to control the device, such as by controlling a mode of operation, an output level, an output type, etc. For instance, the user input structures may include a button to turn the device on or off. Further the user input structures may allow a user to interact with the user interface on the display. Embodiments of the portable electronic device may include any number of user input structures, including buttons, switches, a control pad, a scroll wheel, or any other suitable input structures. The user input structures may work with the user interface displayed on the device to control functions of the device and/or any interfaces or devices connected to or used by the device. For example, the user input structures may allow a user to navigate a displayed user interface or to return such a displayed user interface to a default or home screen.

The exemplary device may also include various input and output ports to allow connection of additional devices. For example, a port may be a headphone jack that provides for the connection of headphones. Additionally, a port may have both input/output capabilities to provide for connection of a headset (e.g., a headphone and microphone combination). Embodiments of the present invention may include any number of input and/or output ports, such as headphone and headset jacks, universal serial bus (USB) ports, IEEE-1394 ports, and AC and/or DC power connectors. Further, the device may use the input and output ports to connect to and send or receive data with any other device, such as other portable electronic devices, personal computers, printers, or the like. For example, in one embodiment, the device may connect to a personal computer via an IEEE-1394 connection to send and receive data files, such as media files. Further details of the device can be found in U.S. Pat. No. 8,294,730, assigned to Apple, Inc.

In embodiments of the present invention, various uses of blockchain coding may provide authentication and verification of the education process. For example, course materials provided directly from an institution (e.g. lecturer, professor) or the modified course materials provided to the user using embodiments of the present invention may be encoded into a first block (not necessarily the ordinal first block) in a block chain. In various embodiments, the authentication may also include proof of accreditation of the course and/or the institution itself. In some embodiments, prior to hashing, the materials may be encoded with a provider private key. It is contemplated that the first block can help verify the materials provide to the user are genuine and authorized.

In some embodiments, education materials provided to the user are customized for each user, for example, by adding the user's name, address, student identifier, or the like to the documents, videos, etc. Accordingly, the blockchain hash of educational materials for different users should also be different. Such techniques are usable in embodiments where course materials are highly valuable, and only students who enroll in the course should be able to receive credit or certification for the course. In such cases, if a third-party attempts use the course materials without registering, the third party cannot receive accreditation for the course. This is because the block corresponding to the course materials in the third party's blockchain will not be authenticated with the third party's name.

Next, in various embodiments, if a user completes a course successfully, an additional block is added to the blockchain. The blockchain hash may be performed upon the student data (e.g. name, student ID, course, time, etc.), one or more certificates of completion, course information (e.g. institution name, professor name, course name, credit hours, etc.), grade, and the like. In various embodiments, the user may be authenticated by other means, such as social security number, private key, password, or the like. In various embodiments, the new block includes a hash of the previous block (e.g. proof that the education materials used were authorized) plus the hash of the above user information. As a result, the blockchain can be used to prove that the authorized user completed a specific course authorized by a specific accredited institution.

In various embodiments of the present invention, as a user repeats the above process for different courses, additional blocks are added to the blockchain. The blockchain thus can verify the user's credits, grades, etc.; can verify that the course was provided by an authorized institution, and can verify that the user was authorized to take the course. In various embodiments, various educational providers, educational institutions, and other distributed stakeholders by store blockchains geared towards educational achievements.

In some embodiments, transactions within the process described above may also include payment information. In various embodiments, payment information may be made using available coin offerings. In other embodiments, payment information may be made using a custom coin offering directed to education on all different levels, education from institutions of higher learning, offerings in conjunction with educational 529 plans, and the like. The inventor is not currently aware of such educationally-directed coin offerings, but believes they may be used in various embodiments of the present invention.

In an example, the invention also includes a method for a secure learning experience using a encrypted encoded network. The method includes configuring a course module information (e.g., user identification, course, pass or non-pass results, and other information) derived from an interactive course platform coupled to a server and a network. In an example, the course module comprises information provided from a human user coupled to a plurality of sensing devices, including at least an image capturing device, a motion sensor, and an ambient sensor. The method includes assigning a time and date stamp on the course module and processing the course module to validate it against a predetermined quality metric, coding format, and ratification information to configure a second course module in a canonical format. The method includes processing the course module in the second format using an encryption process and configuring the course module on a public ledge in a block chain configuration.

Having described various embodiments, examples, and implementations, it should be apparent to those skilled in the relevant art that the foregoing is illustrative only and not limiting, having been presented by way of example only. Many other schemes for distributing functions among the various functional elements of the illustrated embodiment or example are possible. The functions of any element may be carried out in various ways in alternative embodiments or examples.

Also, the functions of several elements may, in alternative embodiments or examples, be carried out by fewer, or a single, element. Similarly, in some embodiments, any functional element may perform fewer, or different, operations than those described with respect to the illustrated embodiment or example. Also, functional elements shown as distinct for purposes of illustration may be incorporated within other functional elements in a particular implementation. Also, the sequencing of functions or portions of functions generally may be altered. Certain functional elements, files, data structures, and so one may be described in the illustrated embodiments as located in system memory of a particular or hub. In other embodiments, however, they may be located on, or distributed across, systems or other platforms that are co-located and/or remote from each other. For example, any one or more of data files or data structures described as co-located on and "local" to a server or other computer may be located in a computer system or systems remote from the server. In addition, it will be understood by those skilled in the relevant art that control and data flows between and among functional elements and various data structures may vary in many ways from the control and data flows described above or in documents incorporated by reference herein. More particularly, intermediary functional elements may direct control or data flows, and the functions of various elements may be combined, divided, or otherwise rearranged to allow parallel processing or for other reasons. Also, intermediate data structures of files may be used and various described data structures of files may be combined or otherwise arranged.

In other examples, combinations or sub-combinations of the above disclosed invention can be advantageously made.

The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

The invention claimed is:

1. A meta system for processing sensor inputs and providing feedback to a user for an on-line course and for distributing information associated with the user of the on-line course on a block chain, the meta system comprising an apparatus comprising:
   a housing configured with a display device, the display device coupled to an input device for communicating text information from the user;
   a processing device;
   a network interface coupled to the processing device, the network interface being configured to couple to a world wide network of computers or a local network of computers;
   a memory resource coupled to the processing device;
   an application comprising a course module, the course module comprising a plurality of templates and at least one video file;
   an image capturing device coupled to the housing and configured to the processing device, the image capturing device being configured to capture an image of at least a facial expression in a first format of the user while interacting with the course module;
   a plurality of sensors for identifying a spatial orientation of the user while interacting with the course module;
   a natural language processor configured for processing information from the text information while the user is interacting with the course module;
   an artificial intelligence module coupled to the processing device, the artificial intelligence module comprising a neural network module comprising a plurality of nodes, the plurality of nodes being numbered from 1-N, where N is an integer greater than 10 and less than 10,000,000, the plurality of nodes being coupled to respective sensors, image capturing device, natural language processor, or other information receiving devices, and an output; and
   an output handler coupled to the output of the neural network module, the output handler configured to provide the feedback to the user; and
   a block chain provided on a public ledger, the block chain include information associated with the user and the course.

2. The apparatus of claim 1 wherein the feedback comprises a plurality of characteristics to allow the user to achieve a predetermined score within a range for the course.

3. The apparatus of claim 1 wherein the natural language processor is configured to process the text information to identify a characteristic of the user in association with the course.

4. The apparatus of claim 1 wherein the plurality of nodes comprises at least 1 million nodes; and wherein the plurality of sensors comprises a camera, a keyboard, an accelerometer sensor, an rf sensor, a gyroscope, a chemical sensor, a temperature sensor, a microphone, or other input device.

5. The apparatus of claim 1 wherein the course is related to science, math, English, history, psychology, engineering, business, finance, accounting, or any other college course subject.

6. The apparatus of claim 1 further comprising a wearable device comprising a set of sensors to characterize movement, orientation, temperature, heart rate, breathing rate, oxygen, and other parameters of the user while interacting with the course, the wearable device being coupled to an input of the artificial intelligence module.

7. The apparatus of claim 1 wherein the housing is shock proof.

8. The apparatus of claim 1 wherein the neural network module is configured to receive information from the image capturing device and output a learning characteristic of the user.

9. The apparatus of claim 1 wherein the neural network module is configured to receive information associated with a facial expression and an eye response from the image capturing device and output a learning characteristic of the user.

10. The apparatus of claim 1 further comprising a location sensor, the location sensor configured to transferring a spatial location information and a time information to the artificial intelligence module.

11. A meta system for processing sensor inputs and providing feedback to a user for an on-line course, to configure the online course, and to distribute the on line course on a block chain, the meta system comprising:
   an apparatus comprising:
   a housing configured with a display device, the display device coupled to an input device for communicating text information from the user;
   a processing device;
   a network interface coupled to the processing device, the network interface being configured to couple to a world wide network of computers or a local network of computers;
   a memory resource coupled to the processing device;
   an application comprising a course module, the course module comprising a plurality of templates and at least one video file;
   an image capturing device coupled to the housing and configured to the processing device, the image capturing device being configured to capture an image of at least a facial expression in a first format of the user while interacting with the course module;
   a plurality of sensors for identifying a spatial orientation of the user while interacting with the course module;
   a natural language processor configured for processing information from the text information while the user is interacting with the course module;
   an artificial intelligence module coupled to the processing device, the artificial intelligence module comprising a neural network module comprising a plurality of nodes, the plurality of nodes being numbered from 1-N, where N is an integer greater than 10 and less than 10,000,000, the plurality of nodes being coupled to respective sensors, image capturing device, natural language processor, or other information receiving devices, and an output;
   an output handler coupled to the output of the neural network module, the output handler configured to provide the feedback to the user and configure the on line course; and a block chain provided on a public ledger, the block chain include information associated with the user and the on line course.

12. The apparatus of claim 11 wherein the feedback comprises a plurality of characteristics to allow the user to achieve a predetermined score within a range for the course; wherein the on line course comprises a personally designed course based upon the feedback to the user.

13. The apparatus of claim 11 wherein the natural language processor is configured to process the text information to identify a characteristic of the user in association with the course.

14. The apparatus of claim 11 wherein the plurality of nodes comprises at least 1 million nodes; and wherein the plurality of sensors comprises a camera, a keyboard, an accelerometer sensor, an rf sensor, a gyroscope, a chemical sensor, a temperature sensor, a microphone, or other input device.

15. The apparatus of claim 11 wherein the course is related to science, math, English, history, psychology, engineering, business, finance, accounting, or any other college course subject.

16. The apparatus of claim 11 further comprising a wearable device comprising a set of sensors to characterize movement, orientation, temperature, heart rate, breathing rate, oxygen, and other parameters of the user while interacting with the course, the wearable device being coupled to an input of the artificial intelligence module.

17. The apparatus of claim 11 wherein the housing is shock proof.

18. The apparatus of claim 11 wherein the neural network module is configured to receive information from the image capturing device and output a learning characteristic of the user.

19. The apparatus of claim 11 wherein the neural network module is configured to receive information associated with a facial expression and an eye response from the image capturing device and output a learning characteristic of the user.

20. The apparatus of claim 11 further comprising a location sensor configured to transferring a spatial location information and a time information to the artificial intelligence module.

* * * * *